United States Patent [19]

Komuro et al.

[11] Patent Number: 5,123,962
[45] Date of Patent: Jun. 23, 1992

[54] FINELY DIVIDED SUSPENSION OF CELLULOSIC MATERIAL

[75] Inventors: Yuuichi Komuro; Katsuo Yamamoto, both of Miyazaki, Japan

[73] Assignee: Asahi Kasei Kogyo K.K., Osaka, Japan

[21] Appl. No.: 569,057

[22] Filed: Aug. 17, 1990

[30] Foreign Application Priority Data

Aug. 17, 1989 [JP] Japan .................. 1-210593
Aug. 17, 1989 [JP] Japan .................. 1-210594

[51] Int. Cl.$^5$ .............................. C08L 1/00
[52] U.S. Cl. .................. 106/163.1; 106/203
[58] Field of Search ............... 106/163.1, 203

[56] References Cited

U.S. PATENT DOCUMENTS

| | | | |
|---|---|---|---|
| 2,978,446 | 4/1961 | Battista et al. | 260/212 |
| 3,023,104 | 2/1962 | Battista | 99/1 |
| 3,146,168 | 8/1964 | Battista et al. | 167/82 |
| 4,374,702 | 2/1983 | Turbak et al. | 162/100 |
| 4,774,095 | 9/1988 | Kleinschmidt et al. | 426/579 |

FOREIGN PATENT DOCUMENTS

| | | |
|---|---|---|
| 39-20181 | 9/1939 | Japan . |
| 60-173001 | 9/1985 | Japan . |
| 61-215601 | 9/1986 | Japan . |
| 62-30220 | 7/1987 | Japan . |
| 1-293144 | 11/1989 | Japan . |

*Primary Examiner*—Paul Lieberman
*Assistant Examiner*—M. DiNunzio
*Attorney, Agent, or Firm*—Sughrue, Mion, Zinn Macpeak & Seas

[57] ABSTRACT

A suspension comprising a dispersing medium containing at least 2% by weight of a fine particles of cellulosic material having a 50% cumulative volume diameter of from 0.3 to 6 μm, wherein a cumulative volume ratio of those particles having a diameter of not more than 3 μm is at least 25% is disclosed. The suspension is obtained by a process comprising subjecting a cellulosic material to a depolymerization pretreatment, followed by wet grinding in a container containing a grinding medium and equipped with a rotary blade for forced stirring of the medium. The suspension is excellent in viscosity, water retention properties, stability, and palatability.

13 Claims, 2 Drawing Sheets

15 μm

15 μm

15 μm

FINELY DIVIDED SUSPENSION OF CELLULOSIC MATERIAL

FIELD OF THE INVENTION

This invention relates to a finely divided suspension of a cellulosic material and a process for producing the same.

BACKGROUND OF THE INVENTION

A suspension comprising finely divided particles of an insoluble substance dispersed in a medium is called a colloidal suspension. A colloidal suspension is characterized by its viscous fluidity property. It is also understood that as the fineness of suspended particles increases or the number or amount of the fine particles increases, the suspension loses its fluidity to show a so-called gelled state. That is, as the degree of fineness or the particle concentration becomes greater, the stability and viscosity of the colloidal suspension are correspondingly increased. A colloidal suspension whose stability or viscosity is sufficiently increased so as to lose fluidity is designated a gel.

It has heretofore been appreciated that a finely divided suspension comprised of a cellulosic material as the insoluble substance can also behave as a colloidal suspension or a gel. In this case, as well, properties of a colloidal suspension or a gel greatly depend on the size, size distribution, and concentration of the suspended insoluble particles of the cellulosic material.

However, it is difficult to finely divide cellulosic material and the state-of-the-art suspensions of a cellulosic material possess only a relatively low degree of fineness despite all the prior efforts made to more extensively comminute the cellulosic material.

The inventors of the present invention have ground wood pulp fibers by using conventional techniques such as a dry ball mill to the full extent possible. Notwithstanding a grinding operation of over 16 hours, it was not possible to obtain particles having a 50% cumulative volume diameter of 12 $\mu$m or less. The term "50% cumulative volume diameter" used herein means a diameter of particles, assuming the particles as being spherical, at which the volume of particles cumulated in order from small ones to large ones reaches 50% of the total volume of the whole particles.

On the other hand, conventional finely divided cellulosic materials include, for example, a microcrystalline cellulose which is a particulate cellulose mainly comprising crystallite aggregates obtained by removing amorphous regions of a cellulose raw material, such as a wood pulp and cotton linters, by hydrolytic degradation with a mineral acid. The microcrystalline cellulose generally comprises coarse particles predominantly having a size of from 15 to 40 $\mu$m. A suspension obtained by stirring the microcrystalline cellulose in water exhibits viscous fluidity, dispersion stability, and gel-forming properties. These properties are attributed to further size reduction of the above-described coarse particles originally sized at from 15 to 40 $\mu$m. According to JP-B-40-26274, page 2, right column, lines 6-10 (the term "JP-B" as used herein means an "examined published Japanese patent application"), these properties are considered as attributed to an increase in the population of crystallites of 1 $\mu$m or smaller in size. In actuality, however, the proportion represented by crystallites of a size of 1 $\mu$m or smaller is no more than 2% by weight, with the remainder of the suspended particles still comprising the coarse larger-sized particles. For the purpose of confirming this fact, the present inventors measured a particle size of a suspension which was prepared by treating a mixture of a microcrystalline cellulose powder and water having a prescribed solid content in a homo-mixer at a rate of 10000 rpm for 5 minutes. The obtained suspended particles did not have a 50% cumulative volume diameter of 14 $\mu$m or less, and a total volume of those having 3 $\mu$m or less was not more than 6% of the total volume of the whole suspended particles, and a total volume of those having 1 $\mu$m or less was not more than 1%. (The above volume ratio is hereinafter referred to as "cumulative volume ratio".) That is, none of the thus obtained suspensions was satisfactory in terms of viscosity and stability.

In order to improve these cellulosic particle size properties, it has been proposed to treat a microcrystalline cellulose suspension by means of a high pressure homogenizer as disclosed in JP-B-62-30220. The high pressure homogenization as proposed comprises repetition of high energy application for a short period of time by passing the suspension through a small diameter orifice at a high speed under a high shear force while giving a pressure difference of at least 200 kg/cm$^2$ and then striking the spouted suspension against a wall surface to drastically reduce the suspension steam speed. JP-B-62-30220 reference describes that a stable and highly viscous suspension can be obtained by the high pressure homogenization but does not disclose the degree of fineness of the resulting particles. As a result of careful experiments duplicating the high pressure homogenization disclosed in JP-B-62-30220, the present inventors have confirmed that the particles which are the most finely divided by the high pressure homogenization still do not have a 50% cumulative volume diameter reduced to 7 $\mu$m or less; with the cumulative volume ratio of particles of 3 $\mu$m or less being 20.8% at the most, and that of particles of 1 $\mu$m or less being 3.9% at the most. It appears that crystallites which are aggregating with a relatively weak force can be degraded at a relatively high efficiency by a cavitation effect of high pressure homogenization whereby the particles are reduced in size to increase stability and viscosity. However, the effect of degradation or comminution is not exerted on those crystallites which are more densely aggregating with a strong force, and size reduction does not significantly occur for these crystallites during high pressure homogenization.

Further, JP-A-56-100801 (the term "JP-A" as used herein means an "unexamined published Japanese patent application") which corresponds to GB Patent 2,066,145 discloses fine fibrous cellulose (microfibril cellulose) obtained by treating an aqueous suspension of a pulp in a high pressure homogenizer. This suspension is an aggregate of fibrillated fibers which are not divided into fine particles and comprises coarse particles having a 50% cumulative volume diameter of 95 $\mu$m or greater. The fibers have a length to diameter (L/D) ratio of 100 or more as shown in FIG. 1 and, therefore, feel very rough to the touch and can be easily twisted by fingers into a string. Further, these fibers are unsuitable as edible fibers because when taken in one's mouth, they feel rough to the mouth and tongue and are easily entangled with each other to form masses of rather unpleasant palatability. Further, the microfibril cellulose cannot be formulated into a high concentration suspension, generally providing a suspension having a concentration of only 2% by weight. This is one of drawbacks of microfibril cellulose as pointed out in *Shokuhin to Kaoaku,* Issue of Nov., 1983, p. 51, col. 4, lines 26-29.

JP-B-2-12494 discloses a process for producing finely divided cellulose particles, in which cellulose fibers from which lignin has been substantially removed by a lignin removal treatment is sealed in a pressure container, heated in a hydrated state under pressure, and rapidly and instantaneously spouted into a reservoir under normal pressure. According to this process, cellulose fibers can be finely divided by the vaporizing force resulting from abrupt pressure release and mechanical impact (and/or grinding) among fibers and between the fibers and the wall surface resulting from rapid spouting. The process, however, cannot provide particles having a 50% cumulative volume diameter of not more than 11 μm. Besides, since the cellulose fibers are exposed to high temperatures of 200° C. or more, they undergo considerable color change to black brown hues and also undergo denaturation.

JP-A-1-293144 discloses a process for finely dividing a wood meal in a wet process by using dimethylformamide, toluene, and the like, as a medium. It describes the resulting particles as having a diameter as small as 6 μm, but this is in reference to a diameter of the shorter axis. The particle size as referred to in the present invention is a value measured with a laser-beam diffraction particle size distribution measuring apparatus. A finely divided cellulosic material having a 50% cumulative volume diameter of 6 μm has an L/D ratio of from 5 to 10, from which the diameter of the shorter axis of these columnar particles can be calculared to be in the range of 3.1 to 2.4 μm. Also, when observed under an electron microscope, almost all of the particles have a shorter axis diameter of not more than 3 μm. Particles finely divided by the process of the present invention to have a 50% cumulative volume diameter of, for example, 0.37 μm, have a shorter diameter of 0.1 μm under electron microscopic observation. That is, the particles obtained by the process of JP-B-1-293144 are far greater in size than those of the present invention.

As described above, despite many previous efforts to obtain a suspension of fine particles of a cellulosic material exhibiting properties of a colloid or a gel, a smooth, stable, and thick suspension has not yet been obtained due to difficulty of finely dividing a cellulosic material.

SUMMARY OF THE INVENTION

An object of this invention is to provide a suspension containing finely divided particles of a cellulosic material in high concentrations.

Another object of this invention is to provide a process for producing such a finely divided suspension.

As a result of extensive investigations, the present inventors have succeeded in obtaining a high concentration suspension of a cellulosic material which is finely divided in a qualitative manner which heretofore has never been achieved by the conventional techniques.

The present invention relates to a suspension comprising a dispersing medium containing at least 2% by weight of fine particles of a cellulosic material having a 50% cumulative volume diameter of from 0.3 to 6 μm, wherein a cumulative volume ratio of those particles having a diameter of not more than 3 μm is at least 25%.

The present invention further relates to a process for producing a suspension of a finely divided cellulosic material, which comprises subjecting a cellulosic material to a depolymerization pretreatment, followed by wet grinding the depolymerized cellulosic material in a container containing a grinding medium and equipped with a rotary blade for forced stirring of the medium.

Figure 1:
FIG. 1 is a scanning electron micrograph (magnification: about 2000) of a conventional microfibril cellulose produced by ITT Rayonier Inc.

1 ... Forced-feed opening
2 ... Stator (container)
3 ... Rotor (rotary blade)
4 ... Outlet
5 ... Cooling jacket
6 ... Separating valve
7 ... Cooling water
8 ... Mechanical seal

DETAILED DESCRIPTION OF THE INVENTION

As stated above, conventionally proposed fine particles of a cellulosic material include a dry- or wet-ground particles, microcrystalline cellulose or a suspension thereof, a microcrystalline cellulose suspension having been treated in a high-pressure homogenizer, particles obtained by jet grinding of a cellulosic material from which lignin has been removed, and finely ground wood meal. However, no technique has been reported whereby a cellulosic material can be finely divided to a 50% cumulative volume diameter of 7 μm or less. From this viewpoint, the conventional cellulose products have the following disadvantages.

A finely divided suspension of microcrystalline cellulose which is prepared by the conventional processes have not only characteristics inherent to cellulose, such as indigestibility, water and oil absorption properties, and physiological effects as edible fibers, but also characteristics attributed to size reduction, such as thixotropic properties, water retention properties, viscosity, and dispersion stability. For making use of these characteristics, use of the microcrystalline cellulose suspension as an additive to foods has been studied. However, as the amount of the cellulose suspension added to foods is increased to sufficient amounts so as to ensure the indigestibility, water and oil absorption properties and the physiological effects as edible fibers, the cellulose cannot be freed from its unpleasant, rough and sandy sensation to the mouth and tongue. In practice, when taking the feel to the tongue into consideration, the amount of cellulose to be added is usually up to 1% by weight. *Daily Foods,* May, 1988, reports that particles of less than 3 μm in size are not perceived as particulate or graing matter by the tongue, but those of 3 μm or greater are perceived as such foreign matter. Since the conventionally obtained suspension of microcrystalline cellulose contains a number of particles of 3 μm or greater, a limit to the amount of this form of cellulose which can be added to foods must be practiced. While it is not easy to quantitatively express palatability because it varies depending on the kind of finally prepared foods and individual perception, as a general proposition, it suffices to say that the smaller the particle size, the better the palatability.

Further, water retention properties, viscosity, and dispersion stability of the suspension are related directly to the suspended particle size of the cellulose. The apparent inferiority of the conventional microcrystalline cellulose suspension to the suspension of the present invention in these characteristics arises principally from the difference in particle size and its distribution. Microcrystalline cellulose is an aggregate of microcrystallines which constitute units finer than microfibril. A microcrystalline is a small particle unit of 3 μm or less, but an aggregate thereof, i.e., microcrystalline cellulose, is a coarse cluster having an average particle size of from 15 to 40 μm. The above-described characteristics including water retention properties, viscosity, and dispersion stability depend largely upon the content of microfine particles such as microcrystallines. The problem associated with the conventional suspension consists in that a proportion of such microfine particles of 3 μm or less, though certainly present, is very low in relation to the total amount of particles. Namely, even in the conventional suspension having the maximum possible degree of particle fineness, a proportion (cumulative volume ratio) of microfine particles of 3 μm or less is only 20.8% by volume at the highest amount possible, whereas one of the suspensions obtained in the present invention contains such microfine particles in a proportion reaching 100% by volume. This is the basis for such a great difference in water retention properties, viscosity, and dispersion stability between the suspensions of the present invention and conventional suspensions. In more detail, the proportion of particles finely divided to a size of 1 μm or less in the most finely divided suspension derivable from conventional practice is only as low as 3.7% by volume, while that in the suspension of the present invention reaches 80% by volume or even higher.

Influences of the proportion (cumulative volume ratio) of suspended particles of 3 μm or less or those of 1 μm or less upon characteristics of a suspension, such as viscosity, are explained below. A suspension prepared by mixing microcrystalline cellulose and water in a concentration of 12.5% by weight and dispersing in a homo-mixer at a rate of 10,000 rpm for 5 minutes has a viscosity of 1585 cps and exhibits fluidity. In contrast, a suspension having the same concentration which is prepared by the process of the present invention is a non-fluid paste having a viscosity of from 40,000 to 99,200 cps. The influence of particle size distribution on viscosity is thus corroborated by this difference.

In the above-described suspension having a viscosity of 1585 cps, the proportion of extremely fine particles of 1 μm or smaller is only 0.9% by volume, with that of particles of 3 μm or less being 8.5% by volume, so that the viscosity cannot increase. The present inventors diluted this suspension to a solid content of 1% by weight and allowed coarse particles to sediment. It was revealed by microscopic observation that all the particles remaining suspended in the supernatant liquid had a particle size of 1 μm or less, but the concentration of cellulose in the supernatant liquid was found to be only 0.003% by weight. This thin supernatant liquid was nearly water and exhibited none of the characteristics possessed by the suspension of the present invention. In other words, besides size reduction, it is also an important factor in the present invention that a suspension should have a sufficiently high concentration of cellulose. A suspension having a concentration of less than 2% by weight cellulose (as a total solid content) has a limited viscosity, which is of a low commercial value, and also entails greater demands in handling, storage and transportation for a given amount of cellulose. A concentration ranging from 5 to 25% by weight is preferred for ease on handling and effective utilization of various characteristics of the suspension.

The size of suspended particles influences not only viscosity but also the water retention properties of a suspension. The terminology "water retention properties" as used herein can be quantitatively expressed by formula:

$$\text{Water Retention (\%)} = \frac{W - w}{w} \times 100$$

wherein W is a weight of a suspension after centrifugal dehydration in a glass filter at a centrifugal force of 1,000 G at 20° C. for 30 minutes; and w is an oven-dry weight of the thus dehydrated suspension.

Namely, a water retention (%) is an indication of how much water a suspension can retain at resistance against a centrifugal dehydration of 1000 G. The present inventors have confirmed that there is a good agreement between a suspended particle size as expressed in a 50% cumulative volume diameter or a cumulative volume ratio of particles having a particle diameter of 3 μm or less and water retention properties. Where the particles have a large size, for example, in the case of the suspension obtained by stirring dehydrated microcrystalline cellulose in a homo-mixer, a 50% cumulative volume diameter is between 15 μm and 19 μm. Such a suspension easily undergoes sedimentation upon being allowed to stand. In contrast, the suspension of the present invention is so stable that it suffers from neither sedimentation nor a phenomenon of water release. This is because the fine particles of a cellulosic material and relatively high water are homogeneously and stably mixed together, and such a structure keeps embracing a relatively high water content as can be seen from the above-mentioned high water retention.

Hence, since the suspension of the present invention contains particles having such a high degree of fineness exceeding the conventionally reached level in a certain high concentration as stated above, it has a smooth creamy texture when taken in one's mouth while reducing the unpleasant feel or sensation to the tongue as a foreign matter, assumes a condition as a paste with good body and substance, and is capable of existing in a stable manner as corroborated by high water retention properties.

To make the suspension of the present invention exert the above-described effects to the fullest extent, the particle size can be controlled as follows. For example, smooth touch to the tongue can be further improved by controlling a 50% cumulative volume diameter to 4 μm or less. Viscosity and water retention properties can also be improved by the same size control.

In order to examine the characteristics of the suspension of the present invention more closely, the inventors diluted various suspensions with distilled water to a concentration of 0.1% by weight and allowed it to stand in a cylindrical tube at 20° C. for 24 hours, and the volume of a sediment thus formed (i.e., the volume of the portion other than a supernatant (clear) portion), expressed in percentage, was taken as an indication of stability. The thus defined stability is a measure of apparent particle fineness and, in other words, a measure of insusceptibility to secondary agglomeration of suspended particles. The suspension according to the present invention undergoes no sedimentation (i.e., no formation of a supernatant portion), showing a stability of nearly 100%, and is stably maintained even when diluted to a concentration of 0.1% by weight. It should be noted, however, that particles having an excessively small size are apt to undergo secondary agglomeration, showing a stability of 50% or less. Therefore, where high stability is particularly required, it is preferable to control a 50% cumulative volume diameter to 1 μm or more and a cumulative volume ratio of particles of 3 μm or less of 95% or less.

Particle size determination is of great importance for the present invention. In the present invention, the 50% cumulative volume diameter and the cumulative volume ratio are measured by using a laser diffraction particle size distribution measuring apparatus "SALD-1100" manufactured by Shimazu Seisakusho Ltd., in which a suspension diluted to a concentration of 0.1% by weight with distilled water in the case of an aqueous suspension or with its main suspension medium in the case of a non-aqueous suspension is subjected to analysis with any secondary particles being degraded by a ultrasonic generator incorporated in the apparatus. Using the apparatus "SALD-1100", the amount of particles having particle sizes within a certain range (e.q., 0.00–0.10, 0.10–0.17, 0.17–0.30, etc.) are measured in terms of the volume of the particles. That is, in theory, particles in a suspension to be measured are classified into several portions with respect to the particle size and the total volume of classified particles having particles sizes within a certain range is measured by analyzing laser diffraction of the suspension. When the total volume of classified particles is cumulated in order from small ones to large ones and the cumulated volume is plotted in the ordinate with respect to the particle size in the abscissa, the 50% cumulative volume diameter is given as a diameter at which the cumulated volume reaches 50% of the total volume of the whole particles in the suspension. In the apparatus "SALD-1100", the laser diffraction of the suspension is automatically analyzed and the results are digitally displayed.

In the present invention, the measurement is performed in the following procedure. In particle size analysis with the above-described measuring apparatus, a measuring range is set between 0.1 to 45 μm. A particle size can be calculated from a relation of scattered light intensity vs. particle size derived from a Mie's formula of light scattering theory (incorporated in the measuring apparatus). A refractive index is selected from a standard refractive index of from 1.7 to 0.2i. A particle size distribution is calculated according to a direct calculation method using the least-squares theory. An analysis on one sample is repeated 7 times at a measuring interval of 2 seconds. A sample uniformly diluted with pure water to 0.1% by weight is analyzed by utilizing a flow cell. The ultrasonic generator should always be kept "on", and ultrasonic wave is applied to the sample for at least 1 minute to prevent agglomeration prior to measurement.

In determining particle diameter of fine particles, care should be taken because measured values often show a large variation depending on the principle of measurement and the type of the measuring apparatus used. For example, a suspension whose 50% cumulative volume diameter is 7.60 μm, 4.55 μm or 0.39 μm (the cumulative volume ratio of particles having a diameter of 3 μm or less is 20.4%, 29.0%, or 96.1%, respectively) as measured by the above-specified method is found to have a smaller 50% cumulative volume diameter, i.e., 1.86 μm, 1.18 μm, or 0.25 μm, respectively, when measured by means of a centrifugal sedimentation type particle size distribution measuring apparatus "CP-50" manufactured by Shimazu Seisakusho Ltd. The smaller values are due to the fact that the cellulosic material is swollen with water and that the fine particles of the cellulosic material exhibit mutual action with water to assume a network structure whereby the particles do not easily sediment. In the basic Japanese patent application Nos. Hei 1-210593 and 1-210594 of this application, the inventors conducted particle size determination by means of a Coulter counter. For example, there is disclosed a suspension as diluted with physiological saline to a concentration of 10 ppm which contains 12,118 particles of 3 μm or greater and 38 particles of 10 μm or greater with no particle of 30 μm or greater each per 10 μg as measured with a Coulter counter equipped with an aperture tube having a diameter of 100 μm "Model ZM" manufactured by Coulter Electronics Co. When the same suspension was analyzed with the above-described laser diffraction type particle size distribution measuring apparatus, it was found that the 50% cumulative volume diameter was 4.55 μm, with the cumulative volume ratio of particles of 3 μm or less being 29.0%. It is thus proved that the above-described suspension had been finely divided to such a degree that could not been reached by the conventional techniques.

Figure 2:
FIG. 2 is a scanning electron micrograph (magnification: about 2000) of a suspension obtained in Example 2.

While the fine particles of cellulosic material contained in the suspension of the present invention are characterized by their size and size distribution, they have an amorphous shape as shown in FIG. 2. The terminology "amorphous" as used herein means that the particles are not true spheres. The particles predominantly comprise those having an L/D ratio of from 1.1 to 15, the most of which have an L/D ratio of from 5 to 10.

Any dispersing medium can be employed in the suspension of the present invention as long as highly pulverized cellulose can be dispersed therein. Such a dispersing media typically includes water. Further included in usable media are polar dispersing media, e.g., dimethyl sulfoxide, and hydrophilic dispersing media, e.g., propylene glycol and glycerin. An appropriate medium is selected from among them according to the ultimate use of the suspension and the like.

If desired, the suspension of the present invention may further contain various additives, such as a small amount of acids, alkalis, antiseptics, and antimicrobial agents for the purpose of preventing rot; salts or sugars for the purpose of decreasing water content activity; and natural gums or synthetic pastes for the purpose of viscosity control.

The terminology "cellulosic material" as used herein means materials containing cellulose. Examples of suitable cellulosic materials are purified pulps obtained by lignin removal, such as a wood pulp, a linter pulp, a bamboo pulp, and a bagasse pulp; cellulose natural fibers, e.g., cotton fibers, cotton linters, and hemp fibers; purified natural fibers obtained by subjecting these natural fibers to a lignin removal treatment; regenerated cellulose molded articles which are regenerated from a viscose or a cuprammonium solution; food fibers of grain or fruit origin (e.g., wheat bran, oat bran, corn husk, rice bran, beer cake, soybean cake, pea fibers, bean-curd (tofu) refuse, apple fibers); and lignocellulose (e.g., wood, straw). Of these cellulosic materials, those comprising crystallites called cellulose I and food fibers are regarded as naturally-occurring substances and are edible without any safety care or any legal restriction. In the case of using cellulosic materials comprising crystallites called cellulose II, the finely divided particles thereof have increased swellability which leads to improved water retention properties. The same is applicable to lignocellulose materials. For example, wood chips and the like can be finely divided only by the process of the present invention to provide a pasty suspension of good body.

A process for preparing the suspension of the present invention will be explained below in detail.

An apparatus for wet grinding which comprises a container containing a grinding medium and equipped with a rotary blade for forced stirring of the medium is generally called a stirred medium wet grinding apparatus, specific examples of which are described hereinafter, and is widely employed for size reduction of inorganic materials, such as pigments, inks, and ceramics. The inventors previously confirmed that the grinding apparatus of this type is capable of finely grinding natural high polymers, e.g., chitin, chitosan, collagen and the like. It has now been found that the apparatus also exerts an extremely high grinding action when applied to cellulosic materials.

Figure 3:
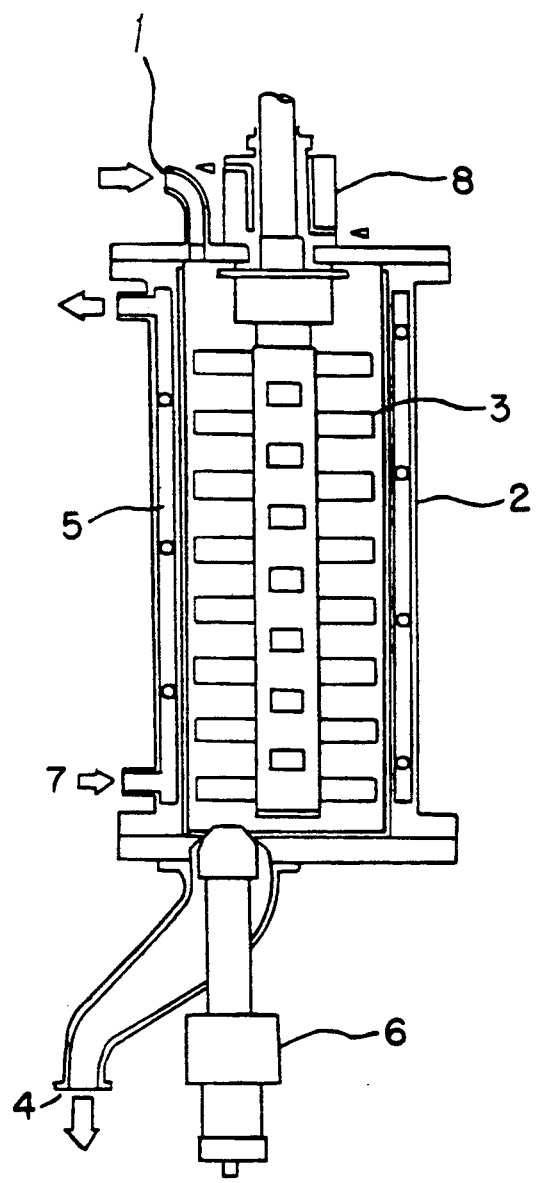
FIG. 3 schematically illustrates a stirred medium wet grinding apparatus used in the present invention. Numerals in FIG. 3 indicate the following parts.

The stirred medium wet grinding apparatus which can be used in the present invention is illustrated below by referring to FIG. 3.

A grinding medium is put in closed container 2 equipped with rotary blades (rotor 3), and a forced motion is given to the medium by rotor 3 rotating at a high speed. A suspension containing a pre-treated cellulosic material is then poured therein and ground while being forcedly passed therethrough.

The grinding medium to be used preferably includes ceramic or metallic beads having a diameter of from 0.3 to 6 mm, preferably from 0.5 to 4 mm and more preferably from 1 to 3 mm. If the diameter of the beads is less than 0.3 mm, it would be difficult to separate the beads from the suspension on withdrawal from the container. If it exceeds 6 mm, the grinding action is reduced.

Media having high hardness, such as those having a Mohs' hardness of 7 to 13, are particularly preferred. Examples include alumina beads, silicon carbide beads, silicon nitride beads, zircon beads, zirconia beads, and ultra-hard stainless beads. Glass beads may also be employable.

Container (stator) 2 generally has a cylindrical shape having inside rotary blade 3. Rotary blade 3 may have various shapes, such as a pin type and a disc type. A rotary blade having pins projected from the cylindrical part thereof is also employable. Blade 3 generally rotates at a peripheral speed of 5 m/sec or more and preferably from 5 to 18 m/sec.

Beads as a medium are charged in the container to a packing of from 60 to 90% by volume. On rotating rotary blade 3, the beads vigorously collide against each other, and the cellulosic material is finely ground by the friction. In the case of continuous running, the suspension of a cellulosic material may be forcedly fed into the container by means of a pump. The container has inlet 1 for forced-feed and, on the opposite side, outlet 4 for withdrawal, whereby a finely divided suspension is withdrawn from outlet 4 in an amount corresponding to the feed from inlet 1. In the case of batchwise running, an open container is generally used.

While the suspension in the container is finely divided by the vigorous grinding action, heat from stirring is evolved to elevate the temperature. For the purpose of absorbing the heat, cooling water jacket 5 is provided around the outer wall of the container. Rotary blade 3 may also be designed so as to be cooled. In cases where size reduction attained through single passage is insufficient, the grinding treatment may be carried out repeatedly.

The suspension may be discharged together with the medium and then separated from the medium by screening to obtain a desired suspension. A rotary stirrer may have such a design that a rotor fitted at a certain clearance from the inner wall of a stator is rotated at a high speed so that movement is given to a medium present in the relatively narrow gap between the rotor and the stator. In some cases, a columnshaped medium may be used to increase a contact area among medium particles.

If a suspension of a cellulosic material (e.g., wood pulp, linter fibers, cotton fibers, hemp fibers, regenerated cellulose, alkali cellulose, food fibers, and ground wood chips) is directly poured into the stirred medium wet grinding apparatus to conduct size reduction, the following disadvantages would be involved.

1) Since the suspended material is susceptible to sedimentation, forcing of the suspension while maintaining constant concentration is difficult.
2) The suspended material is not easily intermingled with the medium in the container and tends to form a layer solely comprising the cellulosic material, resulting in obstruction in the container.
3) The cellulosic material is resistant to being finely divided so that a very high amount of energy is required for size reduction.

The disadvantages (1) and (2) are encountered with continuous running operation, while the disadvantage (3) is commonly encountered in both continuous running and batch-wise running operations.

As a result of extensive studies, the present inventors have discovered that these disadvantages can be eliminated by "subjecting the cellulosic material to at least one depolymerization pretreatment" selected from acid hydrolysis, alkali oxidative decomposition, enzymatic decomposition, steamexplosion decomposition, and steaming decomposition.

Of these pretreatments, acid hydrolysis is preferably effected by treating the cellulosic material with a mineral acid, e.g., sulfuric acid, hydrochloric acid, and phosphoric acid. For example, acid hydrolysis can be carried out using an acid at a concentration of from 0.2 to 20% by weight at a temperature of from 70° C. or higher for a period of 20 minutes or more. With respect to the acid hydrolysis, reference can be made to L.T. Fan et al, *Cellulose Hydrolysis* (1987).

Alkali oxidative decomposition is carried out by treating the cellulosic material with any of alkalis including basic chlorates, basic chlorites, basic hypochlorites, basic perborates, and basic periodates, with reference to, for example, JP-B-44-12906. Sodium hydroxide or potassium hydroxide is usually used as an alkali source. An alkali concentration at the time of oxidative decomposition is preferably 2% by weight or higher. In high alkali concentrations, the decomposition reaction rapidly proceeds even with a small amount of an oxidizing agent. In general, an oxidizing agent is used in an amount of 1% by weight or more based on the amount of cellurose solution. The alkali oxidative decomposition may also be carried out by converting the cellulosic material to an alkali cellulose which is then decomposed with oxygen. In this case, the treatment is generally performed by immersing a cellulosic material in a sodium hydroxide aqueous solution having a concentration of from 12 to 23% by weight to obtain an alkali cellulose, press-crushing the alkali cellulose, and allowing it to stand in an oxygen-containing atmosphere to cause depolymerization.

In carrying out steam-explosion decomposition or steaming decomposition, a raw material is sealed into a pressure vessel, high-pressure steam is blown directly into the vessel to maintain the raw material under a high temperature and high pressure condition, and then the steam is released from the vessel rapidly (steam-explosion decomposition) or gradually (steaming decomposition). Meanwhile, the pH of the material is reduced by the influences of dissociated water and a released wood acid component thereby to automatically conduct acid hydrolysis. Accordingly, the treatment is generally effected at a temperature higher than that employed in acid hydrolysis with a mineral acid, and preferably from 130° to 250° C. The treating time is generally at least 2 minutes, though not particularly limited because the rate of depolymerization largely varies depending on the amount of wood acids produced. If desired, depolymerization of the cellulosic material by steam-heating may be accelerated by previously impregnating the cellulosic material with an acid. In this case, depolymerization proceeds at lower temperatures. With respect to the steam-explosion decomposition and steaming decomposition, reference can be made to Mitsuaki Tanahashi et al, *Kobunshi Kako (Processing of Polymers)*, Vol. 32 No. 12, pp. 39–47 (1983).

The other pretreatment, enzymatic decomposition can be carried out with reference to the aforesaid *Cellulose Hydrolysis*.

The thus pre-treated cellulosic material may be once dried, but may not be dried in case of obtaining an aqueous suspension as a final product. In cases where a treating agent, such as an acid, an alkali, an oxidizing agent, and an enzyme, remains in the pre-treated cellulosic material, such must be removed, in some cases as necessary, by neutralization, washing, desalting, or the like operation.

Once the cellulosic material receives the above-described pretreatment, it is depolymerized and rendered uniformly brittle and is ready to be finely divided. A suspension of the pre-treated cellulosic material has improved dispersibility and easily provides a relatively stable suspension through stirring, preferably light stirring, for example, stirring in a ultradisperser, stirring in a homogenizer, ultrasonic stirring, stirring in a colloid mill, beating in a refiner, treating in various homogenizers or disaggregation machines, and treating in a pulpar. Thus, the suspension can be smoothly fed to a stirred medium wet grinding apparatus, the cellulosic material is satisfactorily intermingled with the medium, and size reduction can easily be accomplished to a desired extent. From the standpoint of ease in the pretreatment and smoothness in the subsequent size reduction, the cellulosic material preferably has a degree of polymerization of not more than 300. By the pretreatment, the degree of polymerization is decreased by 5 to 40.

The kind and combination of the medium of the suspension to be fed to the stirred medium wet grinding apparatus are not particularly limited. For the sake of convenience, an aqueous suspension using water as a solvent is generally preferred. An alkaline suspension, an acidic suspension, an oily suspension, or an organic solvent suspension may also be effectively used.

The cellulosic material having been pre-treated is in a dried state, a wet state, or a dispersed state. In some cases, the concentration of the suspension to be fed to the grinding apparatus should be adjusted appropriately by removal or addition of the suspending medium. If the concentration is too high, the viscosity in the apparatus excessively increases to make feeding difficult and to increase viscosity resistance on withdrawal, actually making running of the apparatus virtually impossible. If the concentration is too low, there is no problem in running of the apparatus or grinding effect, but the resulting product becomes a thin dispersion whose utility is limited. Therefore, it is desirable to adjust the concentration of the suspension to a desired level (preferably not more than 20% by weight and more preferably from 2 to 17% by weight) before grinding. Concentration adjustment after grinding is less effective or useful.

The pre-treated cellulosic material is preferably subjected to a high-pressure homogenizing treatment or a treatment in a colloid mill to reduce the cellulosic material in size to some extent, whereby smooth particle size reduction in the subsequent step becomes feasible, and the time required for obtaining a desired finely divided cellulose suspension can be shortened. The high-pressure homogenizing treatment as referred to herein is a treatment commonly employed for the production of emulsions and dispersions in the field of, for example, diary products. The mechanism of action of the treatment is well known, and reference can be made to, e.g., L.H. Rees, Gaulin Corp., *Chemical Engineering*, Vol. 13 (5), pp. 86–92 (1974). The treating pressure is set at 200 kg/cm$^2$ or higher, and preferably 400 kg/cm$^2$ or higher. It is preferable to pass the cellulosic material through a homogenizer at least twice. The colloid mill treatment as referred to herein is a milling treatment in which a metallic or ceramic rotor is rotated at a high speed in a stator to generate a high shear force in a slight gap between the rotor and the stator. The effective maximum speed of the rotor is preferably 300 m/min or more.

Where the suspension concentration is adjusted by removal or addition of a suspending medium, the above-described high-pressure homogenizing treatment or treatment in a colloid mill may be conducted either before or after the concentration adjustment (i.e., preceding the grinding operation in the stirred medium wet grinding apparatus). When the suspension after the pretreatment has a low water content, it is preferably adjusted so as to have a concentration of cellulosic material of from 2.0 to 25% by weight based on the total weight of the suspension by addition of a suspending medium (water) prior to the high-pressure homogenizing treatment or treatment in a colloid mill. Otherwise, such a suspension of low water content is apt to clog the high-pressure homogenizer or colloid mill.

It is also possible that the stirred medium wet grinding step is followed by a high pressure homogenization treatment or a treatment in a colloid mill or any other equivalent mechanical treatment.

Having been treated in the stirred medium wet grinding apparatus, the suspended cellulosic material is finely divided to have a 50% cumulative volume diameter of not greater than 6 $\mu$m or, in some cases, 1 $\mu$m or even smaller. The finely divided suspension is discharged from the grinding apparatus in the form of a viscous paste having little fluidity. For example, with a certain condition being satisfied, a suspension whose viscosity has been 548 cps before grinding is withdrawn from the grinding apparatus as a pasty suspension having a viscosity of 90,000 cps or more.

It is possible to replace water of the resulting aqueous suspension with a non-aqueous dispersing medium. This can be done by first displacing water medium with a watercompatible solvent, such as acetone and alcohols, and then displacing the water-compatible solvent with a desired nonaqueous dispersing medium. In general, when an aqueous suspension is converted to a non-aqueous suspension, fine particles which have been swollen with water are often devolatized and shrink. As a result, the apparent particle size reduces to increase viscosity.

The suspension according to the present invention is expected to have a wide application in the field of foodstuffs as an indigestible rich food body or a smooth creamy food fiber with no rough feel or sensation to the tongue. For example, a mixture comprising 52.9% by weight of a 12.5% by weight aqueous suspension prepared from a dissolved pulp according to the process of the present invention, 19.8% by weight of water, 1.1% by weight of gelatin, 12.0% by weight of vinegar, 11.0% by weight of an egg yolk, 1.5% by weight of salt, 2.0% by weight of sugar, 0.5% by weight of mustard, 0.2% by weight of sodium glutamate, and 0.1% by weight of white pepper is dispersed in a colloid mill to obtain an oil-free mayonnaise-like dressing which is very close in taste and palatability to conventional mayonnaise prepared by using 73.8% by weight of salad oil. Containing no oil at all, the dressing of the present invention has 1/35 or less the amount of calories as that of the conventional mayonnaise and is therefore promising as a naturally originated substitute for fats and oils.

Besides being useful in the field of food, the suspension of the present invention is also promising in the fields of cosmetics, pharmaceuticals, coatings, constructional materials, lattices, paper, fibers, etc. as cream bases, fluidity modifiers, shape retaining agents, thixotropic agents, thickeners, dispersion stabilizers, film-forming materials, permeability modifiers, gloss modifiers, opacifiers, and the like. Spherical particles obtained by air-drying the suspension of the present invention are expected to be widely used as materials of a fractionation column material, bases of cosmetics, various carriers in biochemistry, abrasives, parting agents, and the like.

The present invention is now illustrated in greater detail by way of Examples, but it should be understood that the present invention is not deemed to be limited thereto. All the parts, percents (except % with respect to the cumulative volume ratio), and ratios are by weight unless otherwise specified.

EXAMPLE 1

A wood pulp having a degree of polymerization of 760 (L-DSP) was dispersed in a 5.0% hydrochloric acid aqueous solution at a ratio of 1 to 10, and the dispersion was heated at 120° to 130° C. for 0.5 hour to conduct hydrolysis. The dispersion was then thoroughly washed with water until the washing became neutral, and the water content was adjusted to obtain a cellulose slurry having a water content of 700% (water to cellulose (dry basis) weight ratio, hereinafter the same).

The slurry was poured into a 2 l-volume stirred medium wet grinding apparatus ("Pearl Mills" manufactured by Ashizawa K.K.) containing spherical ceramic beads having a diameter of 2 mm as a grinding medium at a packing of 80% by volume at a feed rate of 0.69 l/min and passed through the apparatus with the beads being stirred by rotation of a rotor at a rate of 3200 rpm. Five passages through the apparatus gave a pasty milky suspension having a viscosity of 93,500 cps.

As a result of particle size analysis, the suspension having been treated 5 times was found to have a 50% cumulative volume diameter of 2.30 $\mu$m, with a cumulative volume ratio of particles of 3 $\mu$m or smaller being 58.6%.

EXAMPLE 2

An experiment was conducted as follows in order to confirm changes of particle size and various physical properties with the progress of grinding.

A sheet of a wood pulp having a degree of polymerization of 1000 (L-DKP) was cut to a size of 3 mm $\times$ 7 mm, and 3 kg of the chips was uniformly mixed with 6 kg of a 2% sulfuric acid aqueous solution. The mixture was placed in a pressure vessel and subjected to steam auto hydrolysis (steaming decomposition). That, is a high-pressure steam was blown into the vessel to adjust the inner pressure to 2 kg/cm$^2$ and the pressure was kept for 50 minutes. After pressure release, the resulting aqueous slurry was thoroughly washed with water until the washing became neutral and then adjusted to have a solids concentration of 12.5%.

The slurry was preliminarily dispersed in a homo-mixer and then repeatedly subjected to size reduction in a 5 l-volume stirred medium wet grinding apparatus ("Pearl Mill RL-5" manufactured by Ashizawa K.K.) containing spherical alumina beads of 2 mm in diameter at a packing of 85% by volume. The feed rate of the slurry and the number of revolution of a rotary blade were set at 1.00 l/min and 700 rpm, respectively, during the 1st and 2nd passages, and at 0.60 l/min and 700 rpm during the 3rd passage. The feed rate was decreased to 0.24 l/min during the 4th to 8th passages, while the number of revolution of a rotary blade was set at 700 rpm during the 4th passage, 1200 rpm during the 5th passage, 1720 rpm during the 6th and 7th passages, and 2400 rpm during the 8th passage.

After every passage, a sample was analyzed in terms of particle size, viscosity, water retention properties, stability, and touch or feel to the tongue. The viscosity was measured with a Brookfield viscometer. The touch to the tongue was evaluated on each sample by 10 panel members, and a rough feel was rated in four ranks "A" for none, "B" for slight, "C" for medium, and "D" for serious. The majority ranking for each sample was taken as the assigned rank. The results obtained are shown in Table 1 below.

TABLE 1

|  | Number of Passages | | | | | | | | |
| --- | --- | --- | --- | --- | --- | --- | --- | --- | --- |
|  | 0 | 1 | 2 | 3 | 4 | 5 | 6 | 7 | 8 |
| 50% Cumulative Volume Diameter ($\mu$m) | 12.26 | 6.49 | 4.55 | 3.36 | 2.09 | 1.03 | 0.39 | 0.34 | 0.30 |
| Cumulative Volume Ratio of Particles of 3 $\mu$m or | 8.5 | 17.1 | 29.0 | 44.0 | 66.1 | 79.3 | 96.1 | 97.3 | 100 |

TABLE 1-continued

| | Number of Passages | | | | | | | | |
|---|---|---|---|---|---|---|---|---|---|
| | 0 | 1 | 2 | 3 | 4 | 5 | 6 | 7 | 8 |
| Less (%) Cumulative Volume Ratio of Particles of 1 μm or Less (%) | 0.9 | 1.5 | 4.0 | 7.0 | 25.7 | 49.4 | 73.9 | 76.8 | 80.7 |
| Cumulative Volume Ratio of Particles of 30 μm or More (%) | 5.9 | 0.4 | 0.2 | 0 | 0 | 0 | 0 | 0 | 0 |
| Viscosity at 20° C. (cps) | 1585 | 29000 | 47950 | 87200 | 99200 | 80200 | 80000 | 77700 | 60300 |
| Water Retention (%) | 124 | 399 | 489 | 519 | 488 | 471 | 455 | 430 | 407 |
| Stability (%) | 10 | 96 | 98 | 100 | 100 | 100 | 28 | 24 | 20 |
| Rough Touch to the Tongue | D | C | B | B | B | A | A | A | A |

As is apparent from the results of Table 1, the particle size becomes smaller with an increase in number of the passages through the grinding apparatus. From after the 2nd passage, the suspension reveals stable properties as having a viscosity of higher than 40000 cps and a water retention of higher than 400%. Further, rough touch to the tongue takes rank "B (slight)" after the 2nd passage and attains rank "A (none)" from after the 5th passage. It was thus demonstrated that a pasty suspension having a high viscosity and excellent water retention properties with no or reduced rough feel to the tongue can be obtained by the size scheme according to the process of the present invention. With respect to suspension stability, when size reduction is intensively conducted to provide a 50% cumulative volume diameter of less than 1 μm, the stability shows a decrease.

EXAMPLE 3

A suspension was prepared in the same manner as in Example 2, except for adjusting the concentration of the aqueous suspension to be finely ground to 2%, 6%, or 20%. A sample was taken after the 4th passage in the grinding apparatus to determine the particle size. The results obtained are shown in Table 2 below, with the results of the sample after the 4th passage in Example 2. On comparing with the results of Example 2, it was proved that the suspension was satisfactorily pulverized in each case.

TABLE 2

| Suspension Concentration (wt %) | 2.0 | 6.0 | 12.5 | 20.0 |
|---|---|---|---|---|
| 50% Cumulative Volume Diameter (μm) | 4.16 | 2.59 | 2.09 | 4.89 |
| Cumulative Volume Ratio of Particles of 3 μm or Less (%) | 35.4 | 57.2 | 66.1 | 28.1 |
| Cumulative Volume Ratio of Particles of 1 μm or Less (%) | 6.9 | 15.4 | 25.7 | 3.5 |
| Cumulative Volume Ratio of Particles of 30 μm or More (%) | 0 | 0 | 0 | 0.3 |
| Viscosity at 20° C. (cps) | 920 | 25800 | 99200 | 178000 |

EXAMPLE 4

A soft wood sulfite pulp having a degree of polymerization of 740 (N-DSP) was pre-treated by steamexplosion decomposition as follows. The raw material was put in a pressure vessel. After the air in the vessel was purged with steam, the inner pressure was increased with steam. The pressure was kept for 30 minutes at 20 kg/cm$^2$G, 15 kg/cm$^2$G, 10 kg/cm$^2$G or 5 kg/cm$^2$ and then the pressure reducing valve was rapidly opened for pressure release. The vigorously spouting cellulosic material was collected, and water was added thereto to prepare four suspensions each having a concentration of 2%. The concentration adjustment was carried out while dispersing the pulp fiber under stirring in a Henschel mixer.

Each of the resulting aqueous suspensions was finely divided in a batch-wise system in a stirred medium wet grinding apparatus "Attritor MAID(W)" manufactured by Mitsui Miike Kakoki K.K. using zirconia beads of 5 mm in diameter as a grinding medium at a stirring rate of 200 rpm for 10 hours. The thus obtained finely divided suspensions were designated A, B, C, and D, respectively.

COMPARATIVE EXAMPLE 1

A non-pretreated wood pulp type 1N-DSP (degree of polymerization: 740) was suspended in water and adjusted to a concentration to 2%. The suspension was finely divided in the same manner as in Example 3. The resulting suspension was designated E.

Particle size distribution of each of the suspensions A to E was determined. The results obtained are shown in Table 3 below.

TABLE 3

| | A | B | C | D | E |
|---|---|---|---|---|---|
| Pressure in Steam-Explosion Decomposition (kg/cm$^2$G) | 20 | 15 | 10 | 5 | — |
| 50% Cumulative Volume Diameter (μm) | 1.41 | 2.26 | 4.32 | 5.91 | 23.6 |
| Cumulative Volume Ratio of Particles of 3 μm or Less | 72.5 | 50.3 | 32.5 | 27.3 | 1.4 |

It can be seen that each of the suspensions A to D which was obtained by size reduction after steam-explosion pretreatment has a high degree of fineness, whereas the degree of fineness of the suspension E which had not been received such a pretreatment is low.

EXAMPLE 5

Each of the suspensions A to D obtained in Example 4 was further subjected to a high pressure homogenization by passing 15 times through a homogenizer "15M-8TA" manufactured by Gaulin Corporation under a pressure of 560 kg/cm$^2$ to obtain a suspension A', B', C', and D'. The results of particle size analysis on these suspensions are shown in Table 4 below.

TABLE 4

|  | A' | B' | C' | D' |
|---|---|---|---|---|
| 50% Cumulative Volume Diameter (μm) | 0.34 | 0.62 | 0.88 | 0.97 |
| Cumulative Volume Ratio of Particles of 3 μm or Less | 99.1 | 68.3 | 55.3 | 48.6 |

It can be seen that the size reduction is further accelerated by high-pressure homogenization.

EXAMPLE 6

Each of the suspensions A to D obtained in Example 4 was further passed 5 times through a colloid mill "TK Mycolloider L" manufactured by Tokushu Kika Kogyo K.K. at a rotor speed of 3000 rpm to obtain a suspension A", B", C", or D", respectively. The results of particle size analysis on these suspensions are shown in Table 5 below.

TABLE 5

|  | A" | B" | C" | D" |
|---|---|---|---|---|
| 50% Cumulative Volume Diameter (μm) | 1.01 | 1.87 | 3.31 | 4.02 |
| Cumulative Volume Ratio of Particles of 3 μm or Less | 82.4 | 71.4 | 46.3 | 39.5 |

It can be seen that size reduction is further accelerated by treatment in a colloid mill.

EXAMPLE 7

A hardwood sulfite wet pulp having a degree of polymerization of 720 (undried L-DSP) was pre-treated by enzymatic decomposition using each of enzymes described below in an amount of 1% based on the raw material under conditions of a bath ratio of 1:10 (the raw material: water), a pH of 7.0, and a temperature of 60° C. After the pretreatment, the cellulosic material was collected by filtration, dehydrated, and repeatedly washed with water to obtain a 2% suspension.

The enzyme used in the above-described pretreatment was Novozym 188 (cellobiase) produced by Novo Industri AS (Denmark), Celluclast 1.5.L (cellulase) produced by Novo Industri AS, ONOZUKA R-10RS (cellulase) produced by Kinki Yakult K.K. (Japan), Protease (protease) produced by Sigma Chemical Co. (U.S.A.), and α-Amylase (α-amylase) produced by Wako Pure Chemical Industries, Ltd. (Japan). The pretreated cellulosic material had a degree of polymerization of 642, 271, 258, 534, and 641, respectively. Although a degree of depolymerization obtained by the enzymatic pretreatment was not as high in some samples, it was found in every case that a number of cracks were formed on the surface of the pulp fibers to facilitate the subsequent size reduction operation.

The suspension was then continuously ground in a stirred medium wet grinding apparatus "Apex Mill AM-1" manufactured by Kotobuki Giken Kogyo K.K. using zirconia beads of 1 mm in diameter as a grinding medium at a stirring rate of 2000 rpm and at a retention time of 2 minutes. The grinding treatment was repeated 11 times. The resulting suspension was designated F, G, H, I, or J, respectively. The results of particle size analysis on these suspensions are shown in Table 6 below.

TABLE 6

|  | F | G | H | I | J |
|---|---|---|---|---|---|
| 50% Cumulative Volume Diameter (μm) | 2.33 | 3.79 | 1.03 | 4.46 | 5.62 |
| Cumulative Volume Ratio of Particles of 3 μm or Less | 63.7 | 36.4 | 72.2 | 30.5 | 28.1 |

EXAMPLE 8

Purified linters having a degree of polymerization of 1050 were pre-treated by alkali oxidative decomposition in an aqueous solution containing 10% of sodium hydroxide and 5% of each of oxidizing agents shown below for 160 minutes under conditions of a bath ratio of 1:20 (the raw material: water) and a temperature of 70° C. After neutralization with hydrochloric acid, the cellulosic material was collected by filtration, dehydrated, and repeatedly washed with water. Water was appropriately added to obtain a 20% aqueous suspension.

Each suspension was once stabilized by treating in a Bockwolt homogenizer "Model 100" manufactured by Chuo Kiko K.K., and then continuously ground in a stirred medium wet grinding apparatus "Pearl Mill PMIRL" manufactured by Ashizawa K.K. using alumina beads having a diameter of 2 mm at a stirring rate of 2726 rpm for a retention time of 2 minutes. The grinding treatment was repeated 5 times.

The oxidizing agent used in the pretreatment was sodium chlorate, sodium chlorite, sodium hypochlorite, sodium perborate, or sodium periodate. The resulting finely divided suspension was designated K, L, M, N, or 0, respectively. The results of particle size analysis on these suspensions are shown in Table 7 below.

TABLE 7

|  | K | L | M | N | O |
|---|---|---|---|---|---|
| 50% Cumulative Volume Diameter (μm) | 0.53 | 0.95 | 0.34 | 0.42 | 0.58 |
| Cumulative Volume Ratio of Particles of 3 μm or Less | 83.4 | 53.0 | 96.2 | 95.2 | 79.5 |

EXAMPLE 9

A hardwood sulfite pulp having a degree of polymerization of 760 (L-DSP) was soaked in a 18% sodium hydroxide aqueous solution for 20 minutes at 51° C. to obtain an alkali cellulose. The alkali cellulose was press-crushed and dehydrated to a cellulose concentration of 31%, and then the resultant was exposed to an oxidative atmosphere having an oxygen concentration of 40% by volume at 40° C. for 96 hours to conduct alkali oxidative decomposition. The thus pre-treated cellulosic material was washed with water to completely remove the alkali component to obtain cellulose having a crystal form of cellulose II. Water was added thereto to prepare a 12.5% aqueous suspension.

The resulting suspension was fed to a stirred medium wet grinding apparatus "Coball-Mill MS-18" manufactured by Shinko-Pantec Co., Ltd. containing zircon beads of 1.5 mm in diameter as a grinding medium at a feed rate of 30.55 l/hr, and finely divided at a rotor peripheral speed of 13 m/sec. The grinding treatment was repeated 6 times. The resulting finely divided suspension had a 50% cumulative volume diameter of 3.88

μm, a cumulative volume ratio of particles of 3 μm, or less of 42.0%, and a water retention of 635%.

EXAMPLE 10

An experiment was conducted on a suspension containing ethyl alcohol as a non-aqueous dispersing medium according to the following procedure.

The 2% aqueous suspension obtained in Example 3 was centrifuged at 10000 G, and the supernatant liquid was discarded. The residue was diluted with ethyl alcohol and again centrifuged. This displacement operation was repeated 5 times to displace water in the suspension with ethyl alcohol. Finally, the suspension was adjusted to have a concentration of 12.5%. As a result of determination of the particle size and viscosity, the suspension was found to be a highly viscous pasty suspension having a 50% cumulative volume diameter of 3.95 μm, with the cumulative volume ratio of particles of 3 μm or less being 39.4%, and a viscosity of 80300 cps.

EXAMPLE 11

An experiment was conducted on a suspension of food fibers as a cellulosic material according to the following procedure.

Wheat bran was put in a pressure vessel. After purging the air in the vessel with steam, the pressure was elevated with steam, and the material was kept under a steam pressure of 15 kg/cm$^2$G for 30 minutes. The pressure was released, the vessel was opened, and the steamed wheat bran was taken out and suspended in water in a concentration of 10%. The resulting aqueous suspension was subjected to stirred medium wet grinding in the same manner as in Example 7. As a result of particle size determination, the suspension was found to be a creamy viscous paste having a 50% cumulative volume diameter of 5.30 μm, with the cumulative volume ratio of particles of 3 μm or less being 31.0%.

EXAMPLE 12

An experiment was conducted on a suspension of lignocellulose as a cellulosic material according to the following procedure.

Hardwood chips were put in a pressure vessel. After the air in the vessel was purged with steam, the pressure was elevated with steam. The chips were kept under a steam pressure of 31 kg/cm$^2$G for 30 minutes, and a pressure reducing valve was rapidly opened (steam-explosion treatment). The vigorously spouting chips were collected and adjusted to have a concentration of 10% by addition of water.

The resulting aqueous suspension was subjected to stirred medium wet grinding in the same manner as in Example 7 to obtain a viscous paste having a 50% cumulative volume diameter of 3.82 μm, with the cumulative volume ratio of particles of 3 μm or less being 54.0%.

COMPARATIVE EXAMPLE 2

A particle size distribution of a finely divided aqueous suspension of microcrystalline cellulose, one of well-known conventional cellulose fine particles, was analyzed as follows.

A 6% aqueous suspension of microcrystalline cellulose "AVICEL PH 101 grade" produced by Asahi Kasei Kogyo Kabushiki Kaisha was wet ground in a homo-mixer at 10000 rpm for 5 minutes. The thus obtained suspension had a 50% cumulative volume diameter of 14.43 μm, with the cumulative volume ratio of particles of 3 μm or less being 5.9%, and that of particles of 1 μm or less being 0.9%. The viscosity of the suspension was as low as 170 cps.

COMPARATIVE EXAMPLE 3

A microcrystalline cellulose was finely divided by the process disclosed in Examples 1 to 9 of JP-B-62-30220, and a possible degree of size reduction was examined.

A typical microcrystalline cellulose "AVICEL PH 101" produced by Asahi Kasei Kogyo Kabushiki Kaisha was suspended in water in a concentration of 2% or 6%. Each of the aqueous suspensions was repeatedly subjected to a high pressure homogenization using a homogenizer "15M-8TA" manufactured by Gaulin Corporation under a pressure of 560 kg/cm$^2$G. A sample was taken after 5, 10, 15, and 20 passages through the homogenizer. The particle size, viscosity, and water-retention properties of the samples are shown in Table 8 (suspension concentration: 2%) and Table 9 (suspension concentration: 6%). The suspension temperature increased upon the high pressure homogenization and the suspension temperature reached is also shown in Tables 8 and 9. The higher temperature implies formation of finer particles. In Tables 8 and 9, data of the suspensions prepared in the same manner as in Example 2, except for adjusting the concentration of the suspensions to be finely divided to 2% and 6%, are also shown.

TABLE 8

| | Suspension Concentration: 2% | | | | |
|---|---|---|---|---|---|
| | Comparative Example 3 | | | | Example 2 |
| Number of Passages | 5 | 10 | 15 | 20 | 6 |
| Suspension Temperature Reached (°C.) | 70 | 81 | 90 | 92 | — |
| 50% Cumulative Volume Diameter (μm) | 9.22 | 7.89 | 7.23 | 7.02 | 1.10 |
| Cumulative Volume Ratio of Particles of 3 μm or Less (%) | 13.9 | 17.0 | 19.2 | 20.8 | 75.0 |
| Cumulative Volume Ratio of Particles of 1 μm or Less (%) | 3.1 | 3.4 | 3.4 | 3.7 | 48.3 |
| Cumulative Volume Ratio of Particles of 30 μm | 2.5 | 1.6 | 1.2 | 1.3 | 0 |
| Viscosity at 20° C. (cps) | 280 | 380 | 520 | 510 | 1175 |
| Water Retention (%) | 420 | 502 | 769 | 755 | 1360 |

TABLE 9

| | Suspension Concentration: 6% | | | | |
|---|---|---|---|---|---|
| | Comparative Example 3 | | | | Example 2 |
| Number of Passages | 5 | 10 | 15 | 20 | 6 |
| Suspension Temperature Reached (°C.) | 69 | 88 | 89 | 93 | — |
| 50% Cumulative Volume | 9.04 | 8.36 | 7.23 | 7.60 | 0.42 |

TABLE 9-continued

| | Suspension Concentration: 6% | | | | Example 2 |
|---|---|---|---|---|---|
| | | | Comparative Example 3 | | |
| Diameter (μm) | | | | | |
| Cumulative Volume Ratio of Particles of 3 μm or Less (%) | 14.3 | 18.2 | 20.7 | 20.4 | 95.6 |
| Cumulative Volume Ratio of Particles of 1 μm or Less (%) | 3.1 | 3.6 | 3.7 | 3.9 | 76.8 |
| Cumulative Volume Ratio of Particles of 30 μm | 2.2 | 2.6 | 1.5 | 2.4 | 0 |
| Viscosity at 20° C. (cps) | 6600 | 7300 | 12400 | 13400 | 20800 |
| Water Retention (%) | 389 | 478 | 561 | 554 | 1049 |

As is apparent from Tables 8 and 9, it can be seen that the process of JP-B-62-30220 fails to attain a high degree of size reduction as reached in the present invention. Moreover, the suspension of JP-B-30220 is considerably inferior to the suspension of the present invention in terms of viscosity and water retention properties.

Further, when a suspension was prepared in the same manner as described above, except for starting with a 12.5% suspension, the homogenizer refused to run during the 7th passage where the viscosity of the suspension reached 27600 cps. That is, a high-pressure homogenizing apparatus turned out to be unsuitable for treating a high concentration suspension. In this case, the 50% cumulative volume diameter of the resulting suspension was found to be 7.28 μm.

COMPARATIVE EXAMPLE 4

An undried microcrystalline cellulose was subjected to a high-pressure homogenizing treatment according to the process disclosed in JP-B-62-30220, and a particle size distribution was analyzed.

Ten parts of a softwood sulfite pulp having a degree of polymerization of 760 (N-DSP]were poured into 70 parts of a 0.5% hydrochloric acid aqueous solution and hydrolyzed at 130° C. for 1 hour. After neutralization and washing with water, the concentration of the resulting suspension was adjusted to 6%. The suspension was subjected to a high-pressure homogenizing treatment under the same conditions as used in Comparative Example 3. The particle size, viscosity, and water retention properties of the resulting suspension are shown in Table 10 below.

TABLE 10

| Number of Passages | 5 | 10 | 15 | 20 |
|---|---|---|---|---|
| Suspension Temperature Reached (°C.) | 68 | 81 | 88 | 90 |
| 50% Cumulative Volume Diameter (μm) | 18.26 | 14.13 | 7.08 | 7.06 |
| Cumulative Volume Ratio of Particles of 3 μm or Less | 9.6 | 12.6 | 18.9 | 19.1 |
| Cumulative Volume Ratio of Particles of 1 μm or Less | 1.4 | 1.7 | 3.0 | 3.9 |

COMPARATIVE EXAMPLE 5

Various cellulosic materials were finely divided by the process disclosed in JP-B-2-12494, and a possible degree of size reduction reached was examined.

Each of a softwood sulfite pulp (N-DSP), a hardwood kraft pulp (L-DKP), a hardwood sulfite pulp (L-DSP), and purified linters was adjusted so as to have a water content of at least 10%. The cellulosic material was heat treated with pressurized steam in a pressure vessel under a pressure of 30 kg/cm$^2$G for 16 minutes and then instantaneously spouted into a reservoir under normal pressure to conduct size reduction. The particle size distribution of the resulting suspension is shown in Table 11 below.

TABLE 11

| Cellulosic Material | N-DSP | L-DKP | L-DSP | purified linters |
|---|---|---|---|---|
| 50% Cumulative Volume Diameter (μm) | 12.29 | 12.20 | 11.23 | 12.53 |
| Cumulative Volume Ratio of Particles of 3 μm or Less | 9.9 | 11.3 | 11.3 | 11.4 |
| Cumulative Volume Ratio of Particles of 1 μm or Less | 3.8 | 2.8 | 2.6 | 1.7 |

The suspended particles of these suspensions were revealed by microscopic observation to be comprised of crystallites of 1 μm or smaller and microfibril aggregates having a relatively large particle size of 10 μm or more.

COMPARATIVE EXAMPLE 6

Viscose rayon fiber was degraded to a degree of polymerization of 40 by hydrolysis with 20% sulfuric acid at 90° C. for 10 hours. After sulfuric acid was washed off, the suspension was adjusted to obtain a 8% aqueous suspension, which was then homogenized in a Waring blender for 1 hour. The resulting suspension had a 50% cumulative volume diameter of 8.75 μm, with the cumulative volume ratio of particles of 3 μm or less being 7.1%, and that of particles of 1 μm or less being 0.3%.

As described above, the process of the present invention provides a finely divided cellulosic material suspension containing particles of a high degree of fineness that has heretofore never been reached by the conventional techniques in such high concentrations. The suspension according to the present invention exhibits high viscosity, high water retention properties, and high stability and are, therefore, widely useful in the field of food as smooth and creamy food materials with good palatability. These unique characteristics of the suspension of the present invention can also be put to good use in other various industrial fields as well.

While the invention has been described in detail and with reference to specific embodiments thereof, it will be apparent to one skilled in the art that various changes and modifications can be made therein without departing from the spirit and scope thereof.

What is claimed is:

1. A suspension comprising a dispersing medium containing 2 to 25% by weight of a non-spherical cellulosic material, said cellulosic material being in the form of fine particles the majority of which have an L/D ratio of from 1.1 to 10 and have a 50% cumulative volume diameter of from 0.3 to 6 μm, wherein a cumulative volume ratio of those particles having a diameter of not more than 3 μm is at least 25%.

2. A suspension as in claim 1, wherein said fine particles of cellulosic material have a 50% cumulative volume diameter of from 1 to 4 μm.

3. A suspension as in claim 1, wherein the cumulative volume ratio of those particles having a diameter of not more than 3 μm is from 25 to 95%.

4. A suspension as in claim 1, wherein said dispersing medium is an aqueous medium.

5. A suspension as in claim 1, wherein said dispersing medium is water.

6. A suspension as in claim 1, wherein said cellulosic material is cellulose having a crystal form of cellulose I.

7. A suspension as in claim 6, wherein said cellulose is a purified pulp.

8. A suspension as in claim 6, wherein said cellulose is cotton fibers and/or cotton linters.

9. A suspension as in claim 6, wherein said cellulose is hemp fibers.

10. A suspension as in claim 1, wherein said cellulosic material is cellulose having a crystal form of cellulose II.

11. A suspension as in claim 1, wherein said cellulosic material is an edible fiber material containing cellulose of grain or fruit origin.

12. A suspension as in claim 1, wherein said cellulosic material is a lignocellulose material.

13. A suspension as in claim 1, wherein said cellulosic material is a lignocellulose material.

* * * * *